June 25, 1940.  R. LAPSLEY  2,205,595
TRANSMISSION
Filed Oct. 7, 1939  2 Sheets-Sheet 1
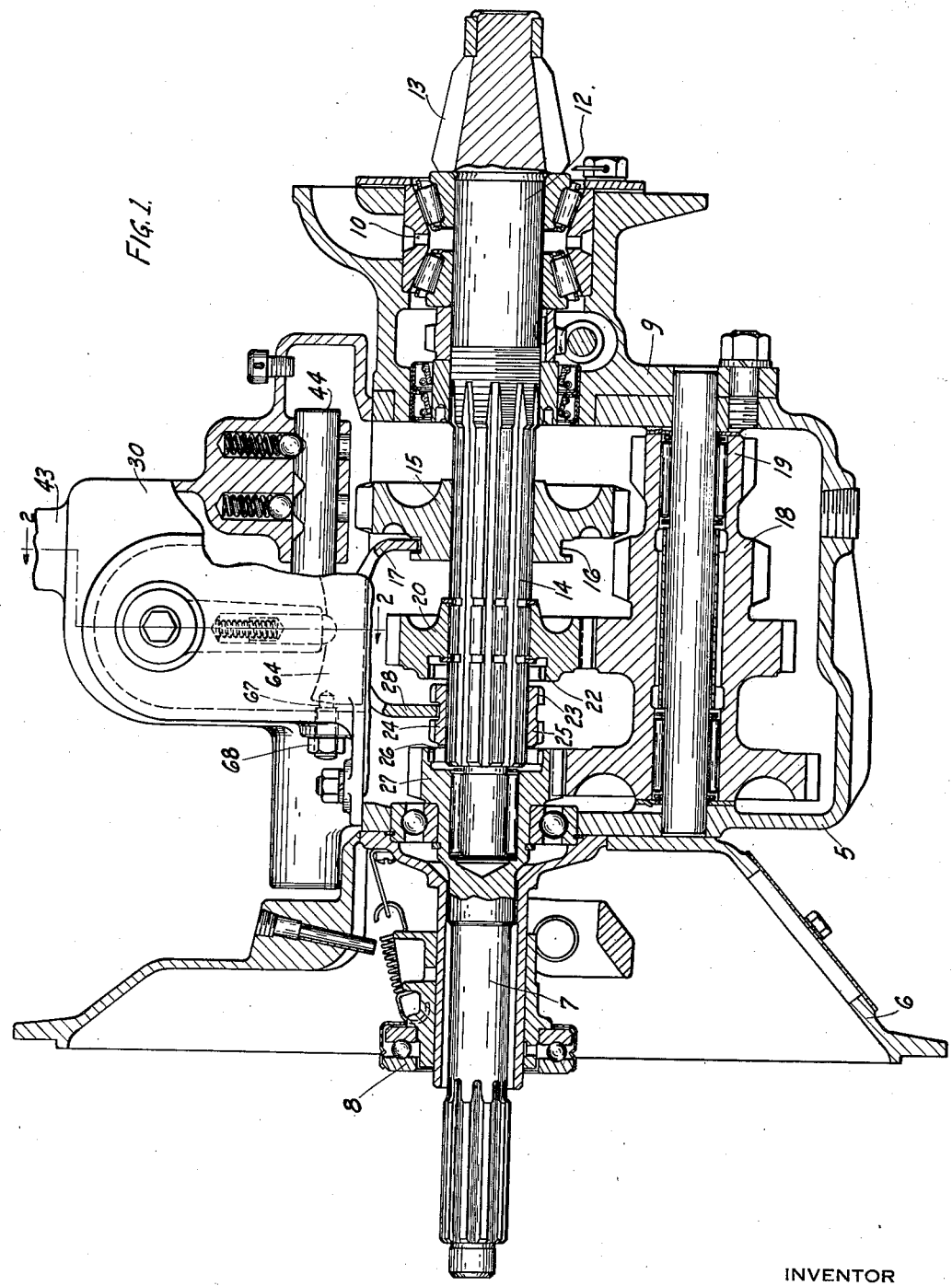
INVENTOR
ROBERT LAPSLEY.
BY Walter E. Schirmer
ATTORNEY

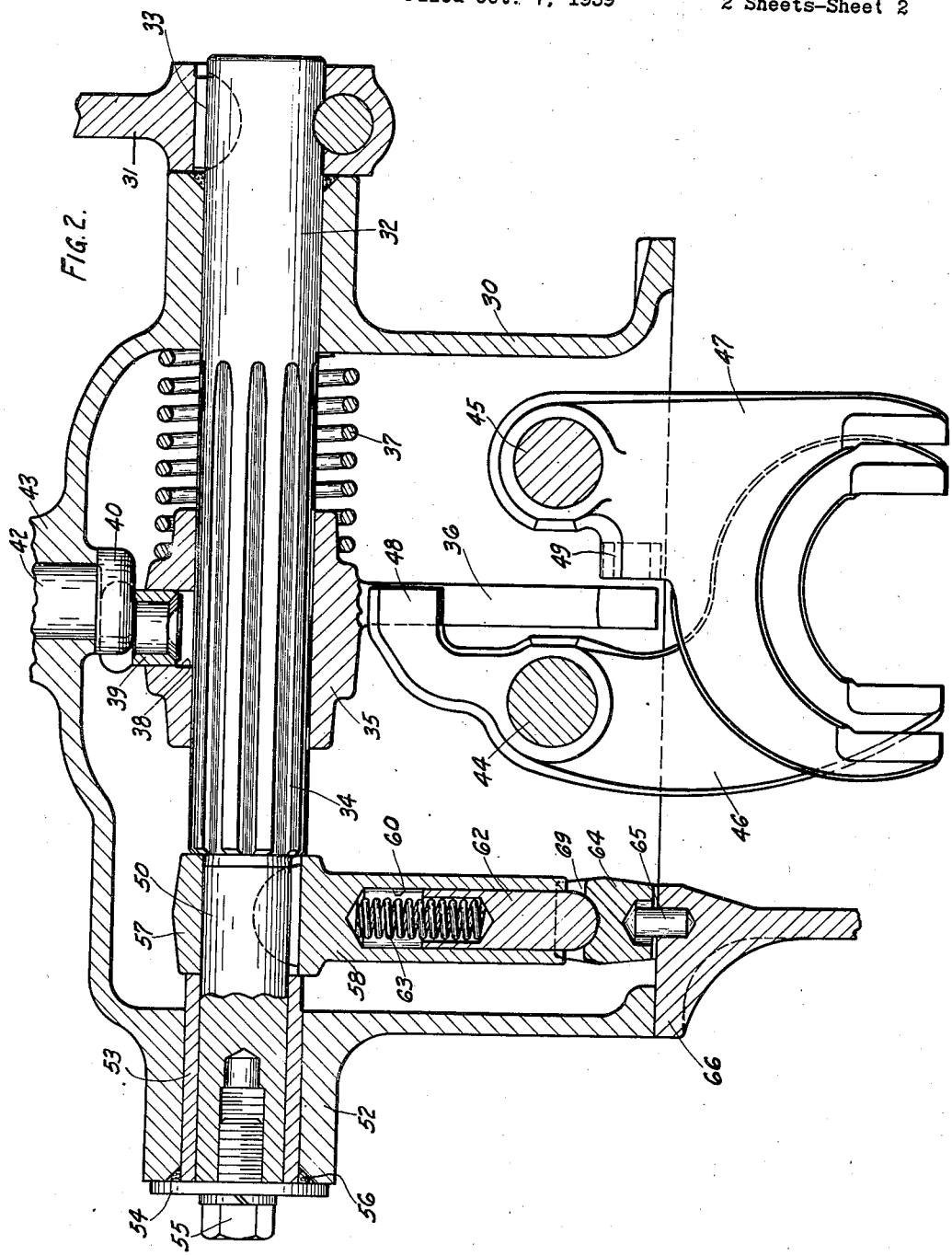

Patented June 25, 1940

2,205,595

UNITED STATES PATENT OFFICE 2,205,595

TRANSMISSION

Robert Lapsley, Berrien Springs, Mich., assignor to Clark Equipment Company, Buchanan, Mich., a corporation of Michigan Application October 7, 1939, Serial No. 298,415

10 Claims. (Cl. 74—475)

This invention is directed primarily to transmissions, and in general is concerned particularly with the provision of means for insuring the return to neutral position of the shifting mechanism when the transmission is operated by control means disposed at a remote point.

It has been found that with remotely controlled transmissions especially of the power type, trouble has been encountered occasionally in that the shifting rails of the transmission are not returned to an absolute neutral position when the remote control mechanism is shifted to neutral, due possibly to over-run or underrun of the air cylinder, electric control or the like, and consequently there may be the danger of binding or interference with free selective movement of the shift means within the transmission.

To overcome such possibilities, the present invention contemplates the use of a locating means capable of adjustment to position to suit the particular requirements of each transmission which is connected into the shifting mechanism in such manner as to provide for a positive location of the neutral positions of the shift mechanism, which location can be adjusted to suit the variations of the remote control mechanism.

One of the primary objects of the present invention is to provide, in a transmission having a rockable shaft which effects the shifting movement at the transmission and which carries a longitudinally shiftable member for effecting selection of the desired shift rail, an arm keyed to the shaft and having detent means engaging in an adjustable positioning member for positively returning the mechanism to neutral position whenever the power shift control means is shifted to such position.

Another object of the present invention is to provide an arcuate shoe or segment having a detent notch formed therein which is engaged by the arm of the shift controlling shaft whereby there will be no possibility of binding of the shift lever, or any interference with the shifting operation from the positively located neutral position, determined in each case by longitudinal adjustment of the shoe.

Other objects and advantages of the present invention will appear more fully from the following detailed description which, taken in conjunction with the accompanying drawings, will disclose to those skilled in the art the particular construction and operation of a preferred form of the invention.

In the drawings:

Figure 1 is a partial vertical sectional view with portions broken away showing the details of a transmission provided with the aforesaid control mechanism; and Figure 2 is a transverse sectional view through the shifting mechanism taken substantially on line 2—2 of Figure 1.

Considering now the drawings in detail, a transmission case is indicated generally at 5 to 10 the forward end of which is bolted the clutch housing 6 carrying the conventional clutch shaft 7 and the thrust bearing assembly 8.

Rearwardly of the housing 5 there is provided the auxiliary housing 9 which has the bearing 15 assembly 10 therein for supporting the rear end 12 of the main transmission shaft, this shaft extending outwardly thereof and being splined as indicated at 13 to receive the universal joint connection to the propeller shaft.

The main shaft 14 of the transmission is provided with the slidable gear 15 having the shifter hub 16 engaged by the shift fork 17 and moving the gear axially upon the splined portion of the shaft 14 for meshing engagement with the gear 25 18 of the countershaft or with an idler gear (not shown) which in turn meshes with the gear 19 on the countershaft. The main shaft is also provided with the gear 20 rotatably mounted thereon having the overhung clutch tooth portion 22 adapted to be engaged by the clutch portion 23 of the clutch sleeve 24, this sleeve having a second clutch portion 25 adapted to mesh with the clutching portion 26 of the gear 27 formed at the end of the clutch shaft 7, whereby the sleeve 24 can be shifted by the engagement of the shifter fork 28 therewith into meshing engagement between the shaft 14 and gear 27 or shaft 14 and gear 20. This construction is more or less conventional, and need not be described in detail for the purposes of the present invention.

Considering now the shift mechanism as shown more clearly in Figure 2, a suitable top plate 30 is mounted on the open top of the transmission case 5 and is adapted to provide a journal support for a transverse shaft 32 which, at its outer end 33, is adapted to be connected through a suitable arm to a remotely disposed shift mechanism.

The shaft 32 has an intermediate splined portion 34 upon which is mounted the collar 35, this collar having the extending shift arm 36 and normally being spring pressed away from the end 33 of the shaft by means of the coil spring 37 biased between the wall of the housing 30 and the collar 35.

The collar 35 is provided with a radial opening 38 adapted to receive the roller end 39 of an arm 40 carried by the shaft 42 projecting out of the housing 30 through the journal portion 43 thereof.

Mounted in the housing 30 below the shaft 33 and extending normal thereto are the shift rails 44 and 45, the shift rail 44 carrying a shifter fork 46 which is adapted to engage the clutch sleeve 24, while the shift rail 45 carries a shifter fork 47 adapted to engage in the hub 16 of the gear 15.

It will be apparent that upon rotation of the arm 42 the roller end 39 is adapted to shift the collar 35 axially on the shaft 32. Control of the arm therefore allows the shift arm 36 of the collar to be selectively engaged with the shifter fork 46, as indicated at 48, or with the shifter fork 47, as indicated at 49, thereby selectively engaging each of the shifter forks for axial movement.

The opposite end of the shaft 32 is provided with a reduced portion 50 which extends outwardly through the journal portion 52 of the housing 30 and is rotatably supported therein by means of the bushing 53. The shaft is retained against movement toward the right, as viewed in Figure 2, by means of the washer 54 engaging the end face of the journal housing 52 and secured to the shaft by means of the stud 55, and is retained against movement in the opposite direction by means of lever 31.

It will be noted that the bushing 53 is provided, at the outer end of the journal portion of the housing, with a cork or similar oil seal 56, and at its opposite end bears against the collar portion 57 of a control arm 58 splined on the reduced portion 50 of the shaft.

Considering now in detail the arm 58, it will be noted that this arm is provided with an axial recess 60 adapted to contain the plunger 62 normally urged outwardly thereof by the spring 63. The rounded projecting end of the plunger 62 is adapted to have bearing engagement on an arcuate locating member 64 positioned on a shelf or ledge 66 in the transmission housing, and mounted for longitudinal positioning by means of the engagement of threaded stud 67 shown in Figure 1 with one end thereof, this stud being adjustable through the nut 68 disposed externally of the housing 30. A second stud (not shown) is engaged with the opposite end of member 64 so that it is rigidly held in adjusted position at all times. A suitable pin 65 is received in a clearance hole in the undersurface of member 64 to prevent its accidental movement into the main part of the housing during assembly or disassembly.

It will be apparent that with such a construction, the member 64 can be moved longitudinally so as to position it in various locations to vary the position of the notch 69 formed therein which forms a detent for the end of the plunger 62. Thus, longitudinal adjustment of the member 64 varies the position of the arm 58, and consequently, the angular position of the shaft 32 when the plunger end is engaged in the notch 69. Thus when the remote control mechanism has been connected to the transmission, it is possible by adjusting the member 64 longitudinally to insure that the shaft 32 will always be rotated to an exact neutral position by the mechanism connected to the end 33 thereof to insure that the shift rails 44 and 45 will also be returned to their desired neutral position upon actuation of the remote control means. In other words, if it is found that the remote control mechanism when returned to neutral position does not, because of manufacturing variations or inaccuracies position the gears in neutral position, adjustment of the member 64 will insure that the shaft 32 return to a positive neutral position by engagement of plunger 62 in notch 69 only when the shift rails 44 and 45 are returned to a neutral position. Since the member 64 can be adjusted externally of the transmission, it is apparent that the construction lends itself readily to control of the position of the shift rails by the remote control mechanism without requiring any disassembly of the transmission itself, or of the shift mechanism carried in the housing 30. This is of distinct advantage, and provides a ready means for insuring proper control of the transmission by the remote control mechanism.

I am aware that various changes may be made in certain features of the present invention, and therefore do not intend to be limited except as defined by the scope and spirit of the appended claims.

I claim:

1. In a transmission, a plurality of parallel shift rails, a transverse shaft extending thereabove, a collar keyed to said shaft for axial movement thereon, means for selectively shifting said collar to engage each of said rails, means for rocking said shaft to move the engaged rail longitudinally, an arm secured to said shaft and having a spring pressed plunger extending radially therefrom, an arcuate shoe over which said plunger rides during rocking of said shaft, a recess therein receiving said plunger for locating said shaft in neutral position, and means for shifting said shoe to adjust the neutral position of said shaft.

2. In a transmission, a transversely extending control shaft, a collar axially shiftable thereon and rotatable with said shaft, said collar having an extending shift lever, means for shifting said collar axially, means for rocking said shaft, a second collar fixed on said shaft and having a spring controlled detent arm, a shoe having an arcuate detent-engaged surface and a central recess for locating a neutral position of said arm, and means for shifting said shoe to vary the neutral position of said arm.

3. A remotely controlled shift mechanism for a transmission including a transverse shaft, a shift arm slidable on said shaft for selective engagement with the transmission shift means and rockable with said shaft for actuating the selected shift means, an arm carried by said shaft having a detent plunger, a shoe engaged by said plunger having a recess for locking the shaft in a predetermined neutral position, and means for shifting said shoe to vary said neutral position of the shaft.

4. In a transmission, a rockable shift control shaft having a shift lever keyed thereto and axially shiftable thereon, an arm keyed to said shaft having a spring pressed plunger at the free end thereof, an arcuate shoe supported in said transmission in the path of movement of said plunger and having a detent in which said plunger engages, and means engaging said shoe for shifting the same to vary the angular position of said shaft at which said plunger engages said detent.

5. The combination of claim 4 wherein said shoe shifting means has a portion disposed externally of said transmission for actuation thereof.

6. The combination of claim 4 wherein said transmission has guide means engaging said shoe to maintain it in alinement during shifting movement.

7. In combination, a transmission having a plurality of parallel shift rails having shift forks, a transversely extending control shaft, a shift lever splined on said shaft for axial movement into selective engagement with said forks, means for rocking said shaft to shift the selected fork and rail longitudinally, axially spaced detent engaging means on said shaft, a detent shoe supported in said transmission having a detent engaged by said detent means, and means projecting externally of said transmission for shifting said detent shoe to vary the angular position of said shaft at which said detent means engages in said detent.

8. The combination of claim 1 further characterized in the provision of pins in said transmission engaging the under surface of said shoe to maintain it in position relative to said detent engaging means.

9. Positioning means for a shift control shaft of a remotely controlled transmission comprising an arm keyed to said shaft having a spring controlled plunger in the end thereof, an arcuate shoe member disposed in the path of movement of said plunger, a detent in said shoe member in which said plunger is engaged in one angular position of said shaft, and means for shifting said shoe member longitudinally to vary said angular position of said shaft upon detent engagement.

10. The positioning means of claim 9 further characterized in the provision of supporting means in said transmission therefor, and means projecting externally of the transmission for actuating said shoe shifting means.

ROBERT LAPSLEY.